United States Patent
Wu et al.

(10) Patent No.: US 8,233,669 B2
(45) Date of Patent: Jul. 31, 2012

(54) SYSTEM AND METHOD TO DETECT CHANGES IN IMAGE QUALITY

(75) Inventors: Wencheng Wu, Webster, NY (US); John C. Handley, Fairport, NY (US); Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 441 days.

(21) Appl. No.: 12/561,487

(22) Filed: Sep. 17, 2009

(65) Prior Publication Data

US 2011/0064278 A1 Mar. 17, 2011

(51) Int. Cl.
*G06K 9/00* (2006.01)
*G06K 9/46* (2006.01)
*G06K 9/66* (2006.01)

(52) U.S. Cl. ......... 382/112; 382/190; 382/194; 382/203
(58) Field of Classification Search .................. None
See application file for complete search history.

(56) References Cited

U.S. PATENT DOCUMENTS

| | | | |
|---|---|---|---|
| 6,483,996 B2 * | 11/2002 | Phillips | 399/38 |
| 6,529,616 B1 | 3/2003 | Rasmussen et al. | |
| 6,571,000 B1 | 5/2003 | Rasmussen et al. | |
| 6,606,395 B1 | 8/2003 | Rasmussen et al. | |
| 7,643,656 B2 * | 1/2010 | Ueda | 382/112 |
| 2001/0016054 A1 * | 8/2001 | Banker et al. | 382/112 |
| 2008/0013848 A1 * | 1/2008 | Wu et al. | 382/254 |
| 2008/0063240 A1 * | 3/2008 | Keng et al. | 382/112 |
| 2008/0267510 A1 * | 10/2008 | Paul et al. | 382/209 |

OTHER PUBLICATIONS

Bozdogan, Akaike's Information Criterion and Recent Developments in Information Complexity, 2000, Journal of Mathematical Psychology 44, pp. 62-91.*

* cited by examiner

*Primary Examiner* — Bhavesh Mehta
*Assistant Examiner* — David F Dunphy
(74) *Attorney, Agent, or Firm* — Oliff & Berridge, PLC

(57) ABSTRACT

A systems and methods for providing an image forming machine capable of monitoring the image quality of images that the image forming machine produces and detecting changes in the image quality. The monitoring system using statistical techniques to fit predetermined models to a measured image quality of time sequence of formed images. The predetermined models used to find current and predicted values of image quality and notifying a user or service provider when the image quality has changed.

20 Claims, 14 Drawing Sheets

$$AIC = -2\log(SSR) + 2(k)$$

FIG. 14

$$\Delta_i = AIC_i - \min(AIC_1, AIC_2, AIC_3...),$$
$$i = 1, 2, 3...$$

FIG. 15A $$w_j = \frac{e^{-\Delta_j/2}}{\sum_j e^{-\Delta_j/2}}, \; i = 1, 2, 3$$

FIG. 15B $$O_{i,j} = \frac{w_i}{w_j}$$

FIG. 15C

SYSTEM AND METHOD TO DETECT CHANGES IN IMAGE QUALITY

BACKGROUND

This disclosure is directed to systems and methods using digital signal processing techniques and statistical techniques to detect changes in Image Quality (IQ) and monitor changes in IQ for image forming devices.

IQ for images formed in an image forming device is dependent on a number of complex and varying factors. Maintaining high IQ is important to users of image forming devices. Users expect that every image formed will be almost perfect to the naked eye and that a series of images formed will all appear identical. Therefore, makers, sellers and providers of image forming devices have a strong interest in maintaining the IQ of image forming devices.

Makers, sellers and providers of image forming devices also have a desire to maintain the IQ of the image forming devices that they make, sell and provide at minimum cost. Therefore, they desire to reduce the number of servicing visits by a technician. They also wish to collect long-term data for evaluating image forming devices so that systematic problems can be identified to improve maintenance schedules, identify defective consumables and improve manufacture and design.

In view of the above, there is a need to be able to identify changes in IQ before they are visible to the user so that maintenance can be performed before the user detects any or unacceptable degradation IQ. There is also a need to identify immediately if a particular image forming device is not performing to the level required to produce images to an appropriate IQ as far as a user of the image forming device is concerned.

Conventionally, servicing on image forming devices is performed when the customer notices a degradation in IQ and calls the provider of the image forming device to schedule maintenance. This inevitably means that the image forming device will be either out of action, or performing poorly, until the maintenance is finished causing the user loss of time and satisfaction. Although the providers of image forming devices are very adept and organized at providing maintenance, providing efficient maintenance services is costly and requires numerous maintenance personnel that may be idle for much of the time.

SUMMARY

In view of the above-identified shortfalls, it may be advantageous to provide a capability whereby changes in IQ can be detected before a user can perceive that the IQ is degraded. Further, it may be advantageous to provide a capability for monitoring IQ over long periods of time and identifying correlations between IQ and a history of the image forming machine and its environment.

The systems and methods according to this disclosure may provide an image forming device capable of (1) monitoring IQ of images that it produces, (2) detecting changes in IQ, and (3) notifying a user or service provider that IQ has begun to degrade thereby alerting those individuals to a need, for example, to service the image forming device before the degradation in IQ becomes perceptible.

The systems and methods according to this disclosure may provide the ability to monitor image forming devices already in the field that are currently not capable of monitoring the images they produce, with respect to IQ, to specifically detect changes in IQ using a system and method separate from, or added to, such an image forming device.

The systems and methods according to this disclosure may provide an IQ monitoring device capable of detecting changes in IQ that cannot be seen by a user.

The systems and methods according to this disclosure may provide the ability to detect changes in IQ by monitoring standard documents formed by a user during the normal course of business, according to the variability of these images.

The systems and methods according to this disclosure may allow IQ to be monitored and changes in IQ detected even when the random variation in the image forming device is high.

The systems and methods according to this disclosure may provide the ability to measure IQ using predetermined test patterns output by the image forming device.

The systems and methods according to this disclosure may provide the ability to correlate changes in IQ to changes in consumables for the image forming device, maintenance performed to the image forming device and changes in environment in which the image forming device is located in use.

The systems and methods according to this disclosure may provide data to enable the continuous improvement of the design of image forming devices in use.

These and other features and functions of the disclosed systems and methods are described in, or apparent from, the following detailed description of various exemplary embodiments.

BRIEF DESCRIPTION OF THE DRAWINGS

Various exemplary embodiments of the disclosed systems and methods for digital error detection in an image forming device will be described, in detail, with reference to the following drawings wherein:

FIG. 14 illustrates exemplary equations for calculating the goodness of fit of a model based on the size of errors for the fit.

FIG. 15 illustrates exemplary equations for converting the goodness of fit to weights and odds ratios;

EMBODIMENTS

Figure 1:
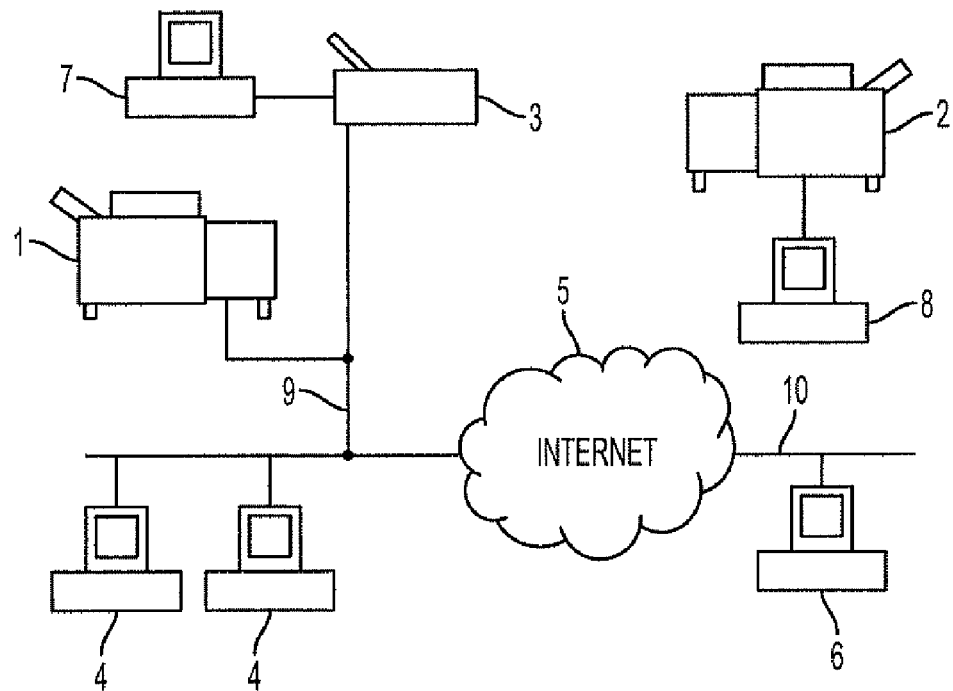
FIG. 1 illustrates an exemplary embodiment of a system of image forming devices and monitoring devices connected via networks and the Internet.

The following embodiments illustrate examples of systems and methods for monitoring and detecting changes in IQ in an image forming device. The following description of various exemplary embodiments for monitoring and detecting IQ of an image forming device may refer to one specific type of image forming device, such as, for example, a xerographic image forming device in the discussion of various terms related to image monitoring within such an image forming device for the sake of clarity, and ease of depiction and description. For example, such terms will include reference to a time-series analyzer, an image processing system, Akaike's Information Criterion (AIC) and an IQ assessor. It should be recognized that, although the systems and methods according to this disclosure may be applicable to, for example, a digital front end in a xerographic image forming device, these depictions and/or descriptions are not intended to be limited to any specific application.

Any system and/or method for image forming that may advantageously apply an IQ monitoring and detection technique according to this disclosure is contemplated. In referring to, for example, image forming devices, such devices may include, but are not limited to, copiers, printers, scanners, facsimile machines, xerographic image forming devices, and/or any other now known or later-developed system or device for producing, reproducing and/or potentially transmitting or receiving monochrome or color images. Further, such image forming devices may include, but are not limited to, lithography machines, various industry printing machines for fabric and building materials, machines for forming patterns for electronic circuitry and machines for producing graphics on cases and parts of industrial and consumer equipment.

Components used in image forming devices such as, for example, photoreceptor drums vary over time due to changes in environmental conditions like temperature and humidity, wear of components due to use, aging of the components because of decomposition, and environmental factors that cause degradation of these materials. Therefore, the IQ of the output image from an image forming device will vary with time. The IQ of an individual image may also be different from that of preceding and succeeding images for various reasons, these include the recent history of the image forming device, such as how many images have been formed in the last minute, what kind of images have been formed and when the machine was last powered up.

Further, IQ will vary because of random events such as, for example, the quantity of toner that is fed by the image forming device to a photoreceptor drum, varying voltages in the machine due to unstable power sources, and variations in environmental conditions such as, for example, changes in temperature or humidity. Random variations from image to image are distinct from the gradual changes in a machine due to aging and wear.

The exemplary measurement systems and techniques according to this disclosure may be capable of separating random events in image-to-image reproduction from reproduction degradations grounded in gradual wear and aging of one or more components in the image forming device. In order to separate random events from the gradual deterioration of the image forming device, it is necessary to collect large amounts of statistical data from large numbers of images to see gradual changes in the IQ of the image forming device over time, distinct from the random variation. Collecting IQ data over a period of time and applying sensitive statistical techniques to the collected data allows deterioration and wear of the image forming device to be detected before it can be seen by a user.

Therefore, one aspect of this disclosure is the use of a system including highly sensitive statistical techniques for determining a current operational state of an image forming device based on measuring IQ for a large number of images produced by the image forming device over a period of time.

A second aspect of this disclosure is the location of, and devices in, the system that may provide the measured IQ.

A third aspect of this disclosure is the location of, and devices in, the system that may determine the state of the image forming device using the highly sensitive statistical techniques and based on the measured IQ.

One method to collect IQ variation over time is to output specific predetermined test patterns that are designed to show off a particular aspect of IQ. Thus, for example, forming a test pattern that is of one continuous color is suitable for detecting banding and streaking in output images. In general, banding corresponds to a change in color density vertically down a printed page and streaking corresponds to a change in color density horizontally across a page. This application is not limited to only these two measures of IQ. It may be applied to any measure of IQ and/or predetermined test patterns for a measure of IQ including, for example, banding, streaking, mottle, graininess, deletions/spots, line and/or text quality, color registration, etc. For each of these measures of IQ, a separate IQ assessor may be used, that is specifically designed to measure that aspect of IQ.

Because it may be appropriate to measure the IQ of a large number of images over a period of time, it is not necessarily advantageous to measure IQ of test patterns. Although test patterns produce potentially more accurate measures of one particular aspect of IQ, a user may not desire that the image forming device continuously or randomly producing test patterns for measuring current IQ. Ongoing test patterns can be wasteful of resources and time. Further, production of test patterns contributes to long term wear and degradation of the image forming device. Thus, it is advantageous if the measurement of IQ of images produced is performed on images being produced by a user in the normal course of day-to-day, or routine, use of the image forming device.

Measuring IQ on user images is more difficult than on test patterns because, in addition to the random variances in output IQ of the image forming device, there is also random noise associated with a user images. Further, some images requested by a user may be inappropriate for measuring IQ. Some images may produce such small signals for measuring any particular aspect of IQ that any measured IQ for that image should not be considered when statistically analyzing data from a plurality of formed images. For example, a blank page, or an image with very sparse text, may not provide a large enough signal for accurately measuring aspects of IQ.

This desire to measure the IQ on images produced during the normal course of business places a higher burden on any statistical or modeling tools used to monitor and detect changes in IQ.

FIG. 1 shows an environment where disclosed detection and monitoring systems and methods may be used. Image forming device 1 is connected to computer network 9. Also connected to computer network 9 are computer terminals 4 and image scanning devices 3. Computer network 9 may also be connected to the Internet 5 and from the Internet 5 to a second computer network 10 with, for example, computer terminals or devices 6 connected to that network. Image forming device 2 may be connected only to a single computer or terminal 8. Scanning device 3 may be connected to a computer terminal or computer 7.

Figure 20A:
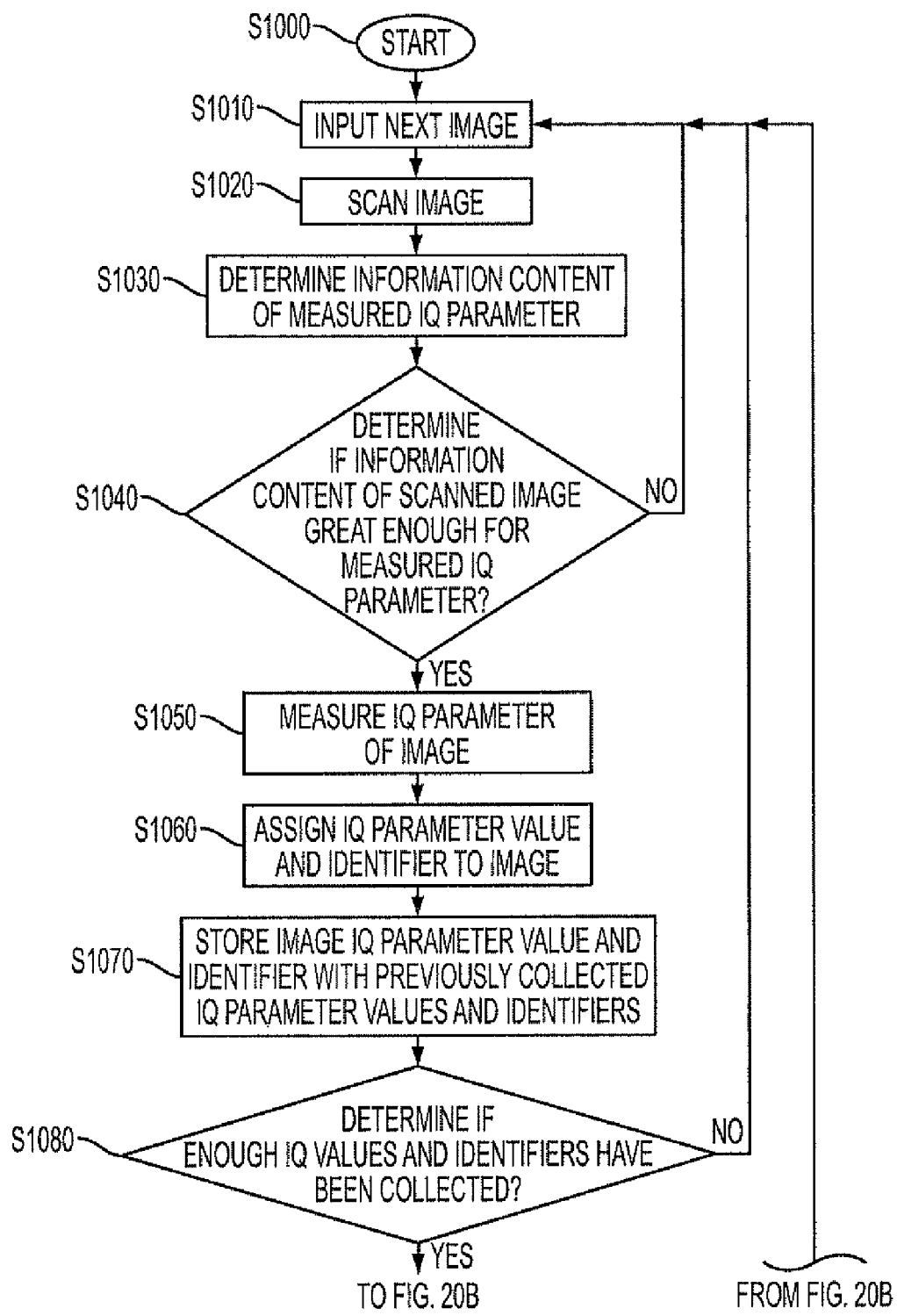
FIG. 20 illustrates an exemplary embodiment for performing a method of monitoring changes in IQ according to this disclosure.
Figure 20B:
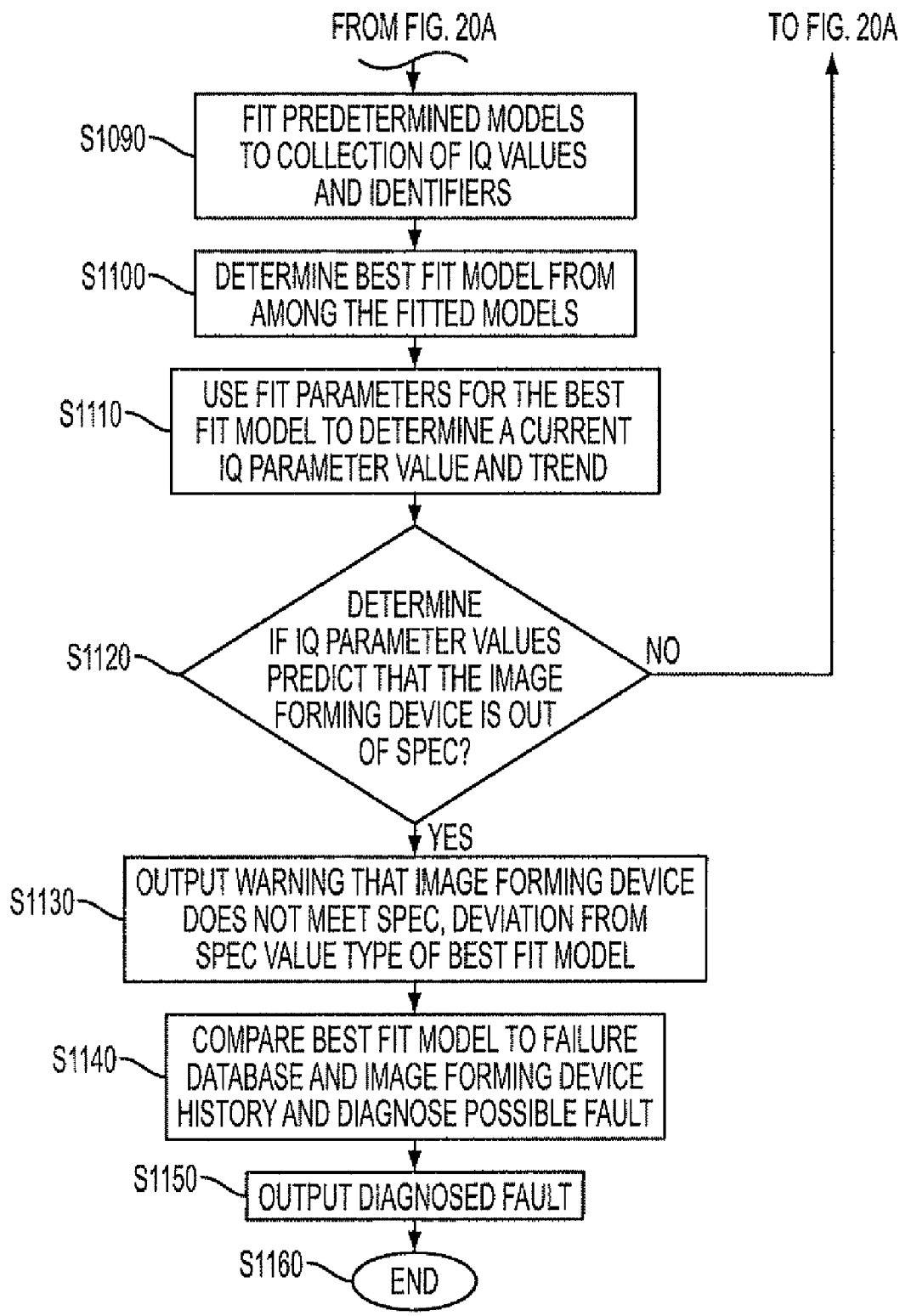

FIG. 20 illustrates an exemplary embodiment of a method according to this disclosure that may be implemented on a network such as that shown in FIG. 1.

The method begins at step S1000 and proceeds to step S1010. In step S1010, a next image is input from an image forming device. This next image may be formed by image forming devices 1 or 2, or formed images may be taken to scanning device 3, as shown in FIG. 1. Operation of the method proceeds to step S1020.

In step S1020, the input image is scanned into digital form so that various image-processing methods may be used to measure one or more IQ parameters of the input image. The scanning of the image may be performed by the image forming devices 1 or 2, either automatically as a part of the image forming process, or as an additional process. Alternatively, the images taken to scanning device 3 may be scanned there. This allows the method and systems to be used with image forming devices already in the field that do not currently include a scanning function. There are various methods by which IQ may be measured. These are described in the U.S. Pat. Nos. 6,571,000, 6,529,616 and 6,606,395, which are incorporated by reference. Operation of the method proceeds to step S1030.

In step S1030, an assessment is made of the information content of the scanned image regarding a measured IQ parameter. This step may measure the information that is available from the scanned image to determine an IQ parameter value. Operation of the method continues to step S1040.

Step 1040 is a determination step. In step S1040, the information available to measure an IQ parameter value is compared to a preset or predetermined threshold. If the amount information available is too small, for example, as is the case with a blank page formed by the image forming device, the measured IQ parameter value for that page is discarded or otherwise ignored, and operation of the method returns to step S1010 to get a next input image.

Alternatively, if in step S1040 it is determined that there is enough information, operation of the method continues to step S1050.

In step S1050, the parameter value is measured. The method proceeds to step S1060.

In step S1060, the image is assigned the determined IQ parameter value and a corresponding identifier. The identifier may be, for example, a sequence number identifying the order in which images are formed. Alternatively, the identifier may be, for example, a time and date on which an image is formed. Operation of the method continues to step S1070.

In step S1070, IQ parameter values and identifiers are stored along with previously collected IQ parameter values and identifiers for images already formed. Operation of the method proceeds to step S1080.

Figure 2:
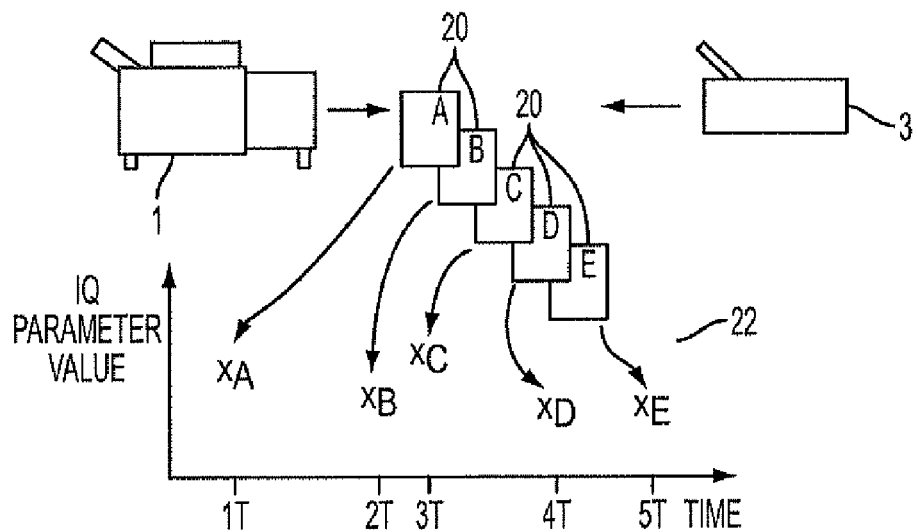
FIG. 2 illustrates an exemplary collection of IQ measurements for images formed by an image forming device.

FIG. 2 illustrates how a measured IQ parameter for images produced by the image forming device may be measured, collected and stored. The measured IQ parameter values for each of the formed images 20 are collected and the time of image forming (1T, 2T, 3T, etc.) or the sequence identifier (A, B, C, D) of the image are stored to form a collection of stored IQ parameter values in a manner shown, for example, in graph 22.

Steps S1030 and S1050, namely, assessing the information content for the IQ parameter and measuring the IQ parameter are computationally intensive and these steps may be performed in several places within the system shown in FIG. 1. Image forming devices 1 and 2, or scanning device 3, may perform both of these steps internally. In the case of image forming device 1, because this device is connected to network 9 and Internet 5, the digitized scanned image may also be sent to any of the devices connected to network 9 and Internet 5 to be processed. The scanned images, however, constitute a large amount of data to send across a network. Therefore, local processing within an individual scanning or image forming device may be preferable.

IQ parameter values for images 20 likely contain far less data than the original scanned images. As the IQ parameter values can, for example, be stored on image forming devices 1 or 2. The IQ parameter values may also be easily sent across networks 9 and 10, and Internet 5, to be stored as a collection of IQ parameter values in a number of places in the system. Since image forming device 1 is connected to network 9 and Internet 5, the IQ parameter values may be transmitted to any device connected to network 9 or Internet 5 to be stored. Image forming device 2 is connected to a single computer or terminal 8. Thus, any measured IQ parameter values can be stored on computer or terminal 8. Scanning device 3 is also connected directly to a computer or terminal 7, and also to network 9 and Internet 5. Therefore, measured IQ parameter values may be stored on any of the devices connected to these networks, as for image forming device 1.

Figure 3:
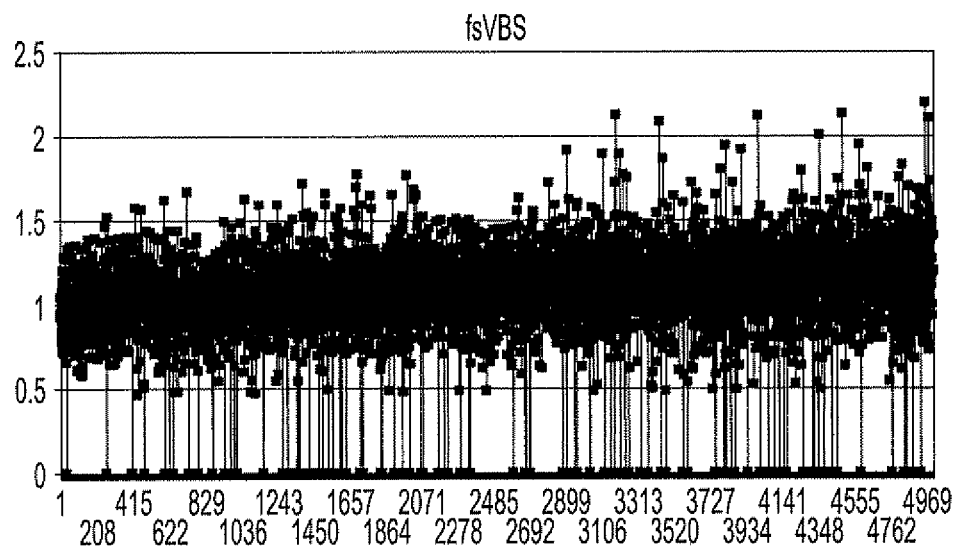
FIG. 3 illustrates measured streak IQ for a first example of a 5,000-page print run using customer documents.
Figure 4:
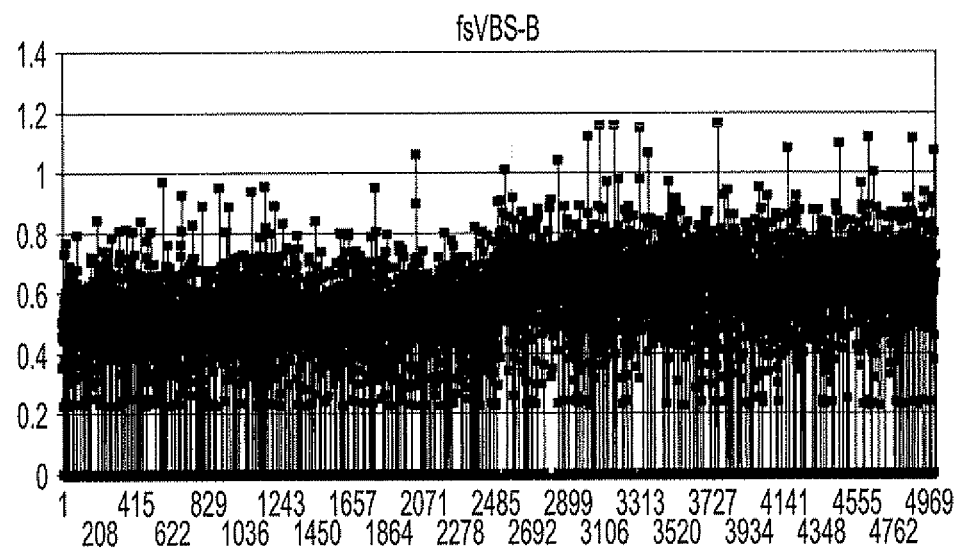
FIG. 4 illustrates measured banding IQ for a second example of a 5,000-page print run using customer documents.
Figure 5:
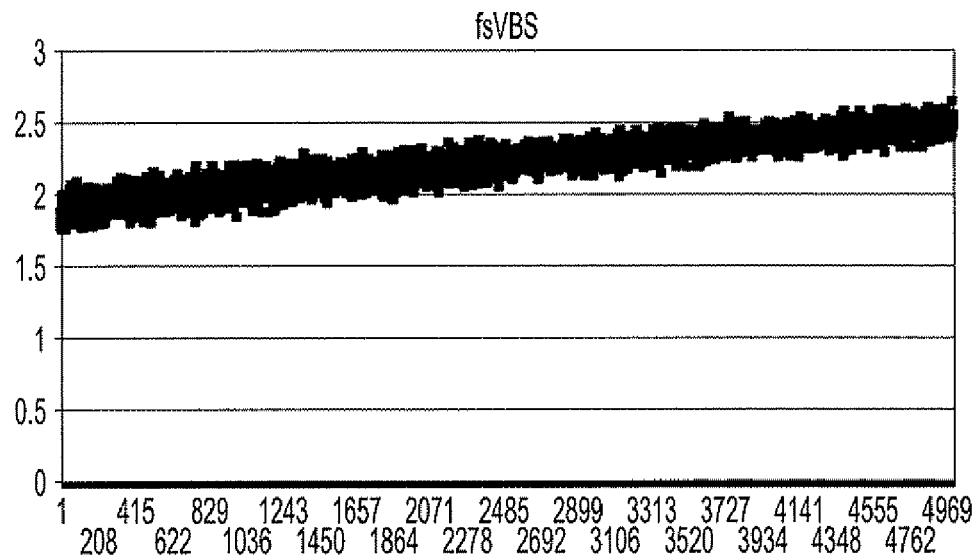
FIG. 5 illustrates measured streak IQ for a third example of a 5,000-page print run using a test pattern.
Figure 6:
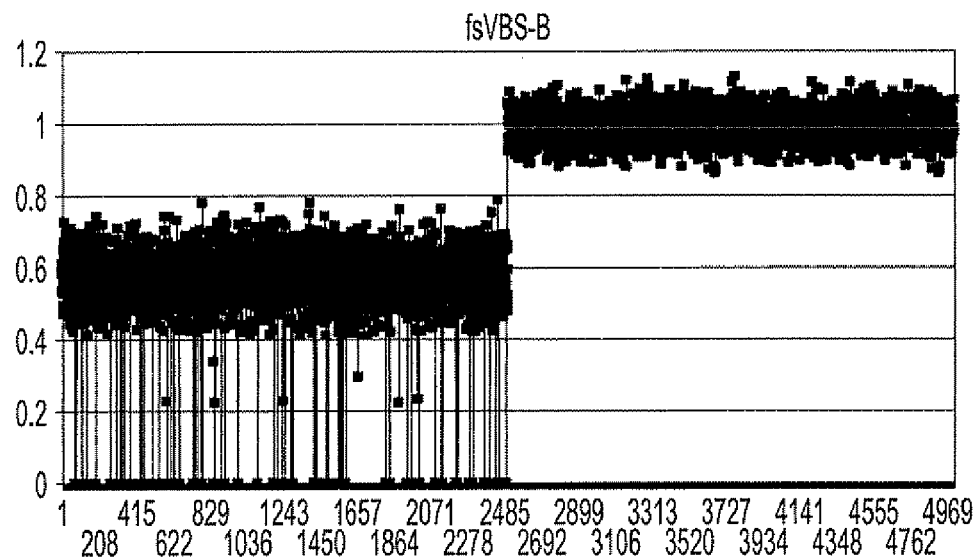
FIG. 6 illustrates measured banding IQ for a fourth example of a 5,000-page print run using a test pattern.

FIGS. 3-6 graphically depict examples of data collected from a 5,000-page print run for measured streak IQ parameter values and measured banding IQ parameter values on customer documents formed during the usual course of business and on test patterns. Measured IQ parameter values from customer documents may contain a significant amount of noise and error in the signal compared with the measured IQ parameter values collected from test patterns. These figures demonstrate the need to use statistical techniques to determine an overall IQ of images that a particular image forming device is currently producing. The measured image IQ parameter values collected from test patterns show a gradual worsening of IQ with regard to streak, which is clearly visible in the data collected from the test patterns, as shown in FIG. 5. In FIG. 6, there is a clear sudden worsening of IQ with respect to banding. These two trends are, however, difficult to see from the measured IQ parameter values collected from customer documents, as shown in FIGS. 3 and 4.

Returning to FIG. 20, Step S1080 is a determination step. In step S1080, a determination is made as to whether a number of collected IQ parameter values is large enough to reasonably support application ("fitting") of a mathematical model to the data collected. What constitutes a reasonable number of collected IQ parameter values may be determined in a number of ways, for example, it could be based on previously collected data for a number of image forming devices and rules of thumb for when it is likely that enough IQ parameter values have been collected. Alternatively, by assessing apparent random variation in collected IQ parameter values, it may be determined when enough values have been collected so that fitting a model will produce parameter values for the model that have sufficiently low noise to determine the underlying IQ state of the machine. In general, it is expected that the noise of the collected IQ parameter values in any fitted mathematical model may have approximately the noise observed between the collected IQ parameter values divided by the square root of the number of collected values. This assumes that any noise generating mechanisms are truly random and uncorrelated. The value calculated by this technique may then be compared with a predetermined threshold value to determine if enough IQ parameter values have been collected. If there are insufficient IQ parameter values collected, operation of the method returns to step S1010 to input the next image.

If, in step S1080, enough IQ parameter values have been collected and stored, operation of the method continues to step S1090.

In step S1090, mathematical models are fitted to the collected IQ parameter values and identifiers. Models may be fitted as best as possible by varying parameters associated with each model until a closest fit between the model and the collected IQ parameter values is found. This fitting may be accomplished through a number of processes, using, for example, maximum likelihood techniques or least squares techniques. These techniques are applied, as appropriate, to attempt to minimize the overall difference between the collected IQ parameter values and the best fit model. This disclosure is not limited to maximum likelihood techniques or least square techniques, however, but rather may employ any currently known or future technique to find a best approximation model for the collected IQ parameter values. Operation of the method continues to step S1100.

Figure 7:
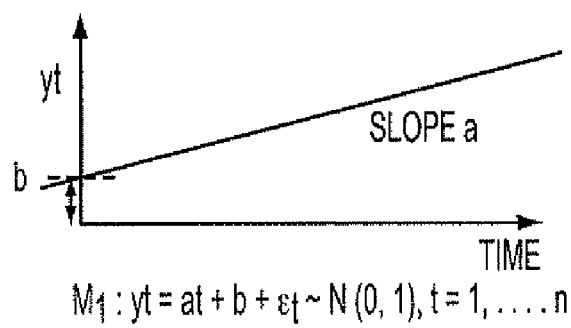
FIG. 7 illustrates a first example of a mathematical model that may be fitted to a measured IQ for a plurality of images formed by an image forming device.
Figure 8:
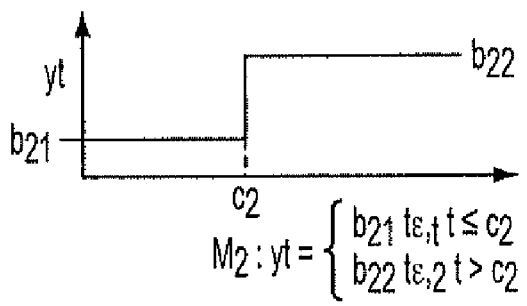
FIG. 8 illustrates a second example of a mathematical model that may be fitted to a measured IQ for a plurality of images formed by an image forming device.
Figure 9:
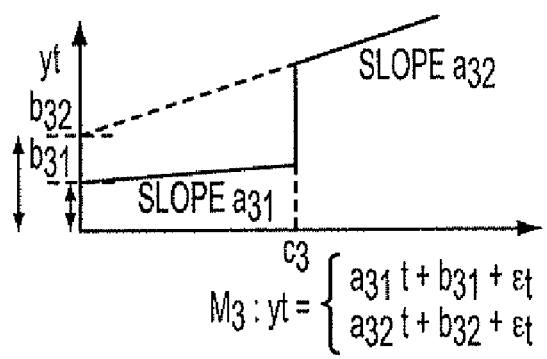
FIG. 9 illustrates a third example of a mathematical model that may be fitted to a measured IQ for a plurality of images formed by an image forming device.
Figure 10:
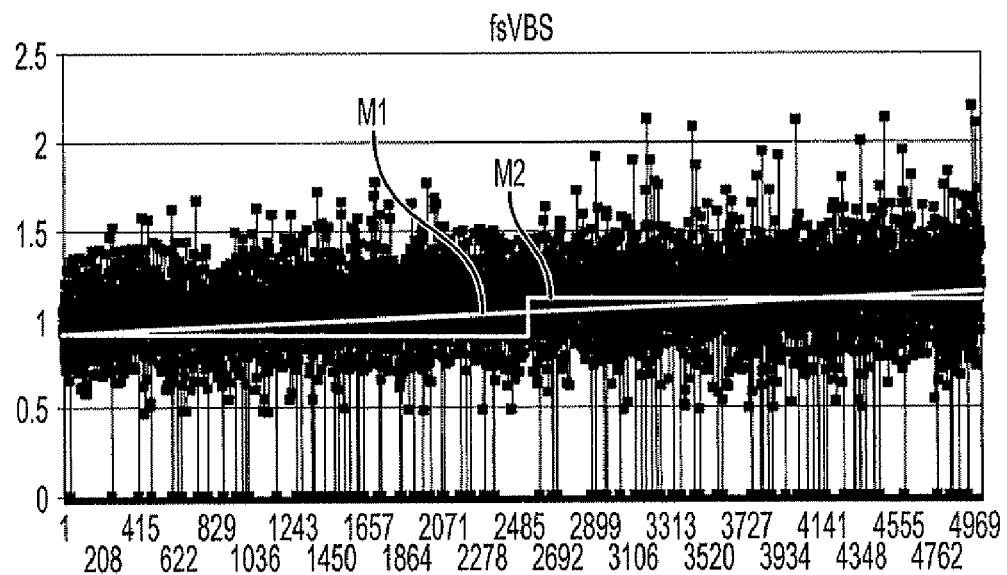
FIG. 10 illustrates exemplary models fitted to the measured IQ of FIG. 3.
Figure 11:
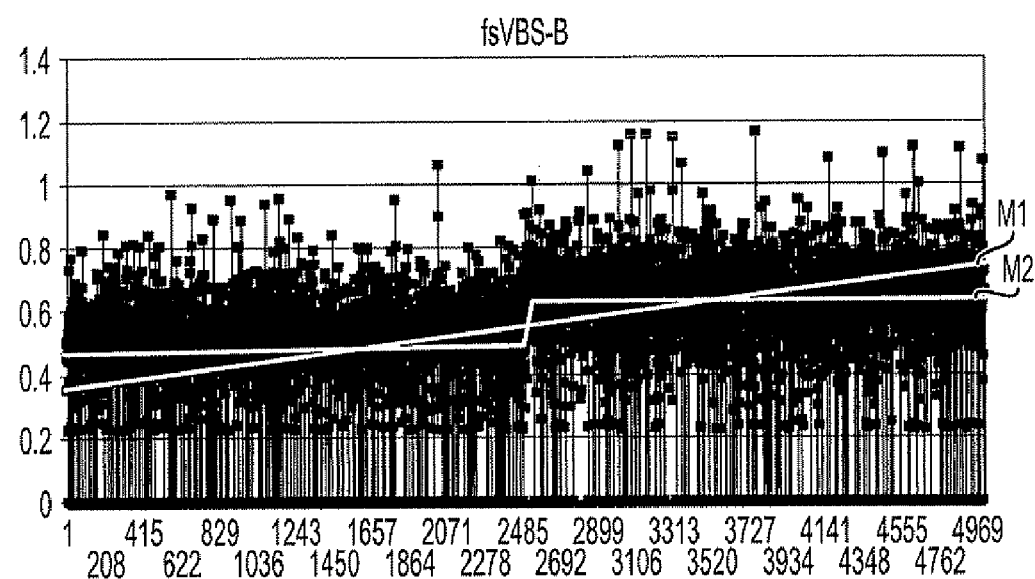
FIG. 11 illustrates exemplary models fitted to the measured IQ of FIG. 4.
Figure 12:
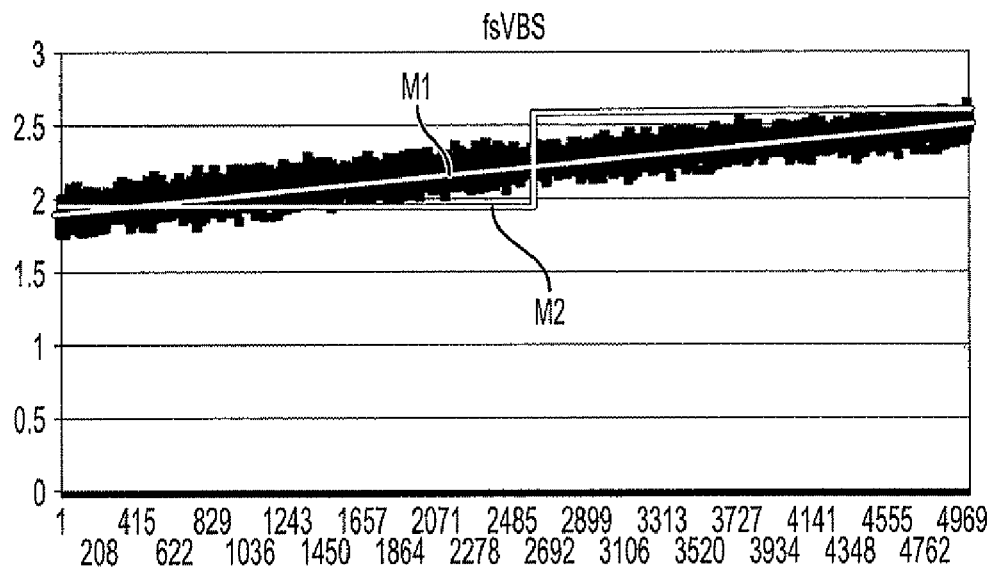
FIG. 12 illustrates exemplary models fitted to the measured IQ of FIG. 5.
Figure 13:
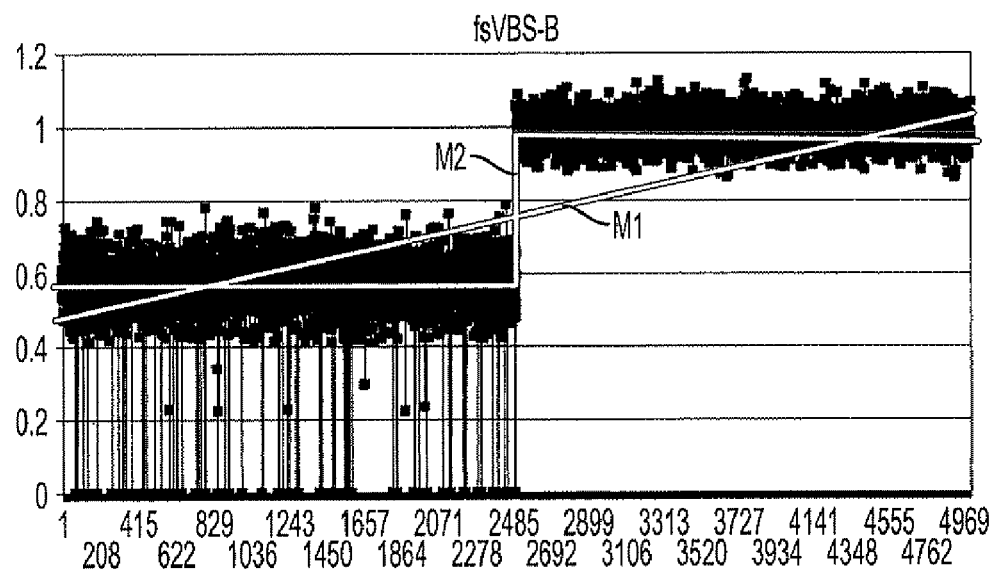
FIG. 13 illustrates exemplary models fitted to the measured IQ of FIG. 6.

FIGS. 7-9 show three examples of specific models that may be fitted. FIG. 7 shows a model, M1, which assumes that the measured IQ will drift with time or sequence number of images formed in a linear fashion. Thus, if noise and randomness are removed from the collected IQ parameter values, this model predicts that the drift IQ, yt, can be represented by a line with slope a and intercept b. The model also allows for an error in each of the measurements, εt. FIG. 8 shows a model, M2, in which the measured IQ changes abruptly with time or sequence number of formed images. Thus, as shown in FIG. 8, at time, ct, there is an abrupt change in the collected IQ parameter values from a value b21 to a value b22. Once again, this model assumes that each image will have a certain quantity of noise, εt. FIG. 9 shows a third model, M3 which assumes a combination of the effects of the models shown in FIGS. 7 and 8. Thus, at a time, c3, there is an abrupt change, in the collected IQ parameter values. Along with this abrupt change, the collected IQ parameter values drift linearly with time, but with a different slope and intercept before and after the abrupt change.

The above serve only as examples of models that might be proposed and this disclosure is not limited to solely the models shown in FIGS. 7-9. Any mathematical model may be constructed that is a reasonable representation of how the collected IQ parameter values, as a representative of IQ of the image forming device, may vary over time. For example, polynomial function models might also be effective, and models that show a cyclic variation of the collected IQ parameter values with time or formed image number may also be used. Any model that contains a reasonable number of parameters to define it that can further be fitted to the collected IQ parameter values likely represents a reasonable model to be used with the methods disclosed in this application.

Models may be developed based on some understanding of how an image forming device performs or changes with time as well. Thus, for example, the linear model, M1, shown in FIG. 7, corresponds to a gradual wear of a part of the image forming device, whereas the model M2, shown in FIG. 8, corresponds to a sudden change in a component of the image forming device. M2 might correspond to, for example, a part of the device that is shifted in position, a change of consumables used by the image forming device, or a power outage. M3, shown in FIG. 9, might correspond to a combination of the above effects.

FIGS. 10-13 show examples of a linear model M1, and a step model M2, fitted to the data collected in FIGS. 3-6. It can be seen that M1 is a better fit for FIG. 12 and M2 is a better fit for FIG. 13. Which model is a better fit is less clear for FIGS. 10 and 11 without a further analysis, such as the exemplary analysis described, for example, Step S1100 above. FIGS. 10-13 demonstrate an advantage of fitting the models to the collected IQ parameter values, which is that, as discussed below, the fitted models inherently tend to filter noise from the collected IQ parameter values.

In step S1100, a determination is made of a best fit model from among the candidate models fitted to the collected IQ parameter values. Operation of the method continues to step S1110.

An example of such a determination to find a best fit model is the residual sum of squares (SSR) method. In the SSR method, the residual sum of squares is the sum of the squares of the differences between the collected IQ parameter values for any image and an IQ parameter value predicted by that model. A simple analysis would suggest that the model with the lowest SSR would be the best fit. However, because in general, different models have different numbers of parameters to fit, the analysis is not so straightforward.

Akaike's Information Criteria (AIC) is an example of a method to find the best fit taking into account a number of parameters in a particular model. The expression for calculating AIC is shown in FIG. 14, where k is the number of parameters in the model. Referring again to FIG. 7, the model M1 has two parameters, a and b. M2, shown in FIG. 8, has three parameters, b21, b22 and c2. M3, shown in FIG. 9, has five parameters, a31, a32, b31, b32 and c3. The AIC method effectively accounts for the fact that a model with more parameters would be expected to have a better fit than a model with fewer parameters. Thus, for example, M3 can be fitted to a linear change in the collected IQ parameter values as well as M1. However, the fitted M3 model will have a31 equal to a32, and b31 equal to b32. For a linear drift, the SSR would be identical. Because M3 has more parameters, its AIC will be larger than the simpler model of M1, and the simpler model will be selected.

There are theoretical reasons for using AIC as a means of ranking models based on entropy beyond the above simple explanation. However, this analysis is beyond the scope of this disclosure. Further, this disclosure is not limited to the AIC method and any method for ranking models, for example, the Schwarz Criterion method, may be used in combination with the other methods and systems in this disclosure.

Assuming that the models available to be fitted represent most of the potential situations that might be observed in an image forming device, it is possible to calculate a probability that any particular model is the correct model. This is achieved by feeding AIC values of the various models into the equations shown in FIG. 15A. First, $\Delta i$ values are calculated the $\Delta i$, values correspond to a difference between each AIC value and the minimum AIC values from among the AIC values. The $\Delta i$ values are then fed into the second equation shown in FIG. 15B to calculate weighted values for each model. The weighted values are then fed into the third equation of FIG. 15C to calculate odds ratios O i,j. The odds ratio describes how much more likely model i is than model j.

Figure 16:
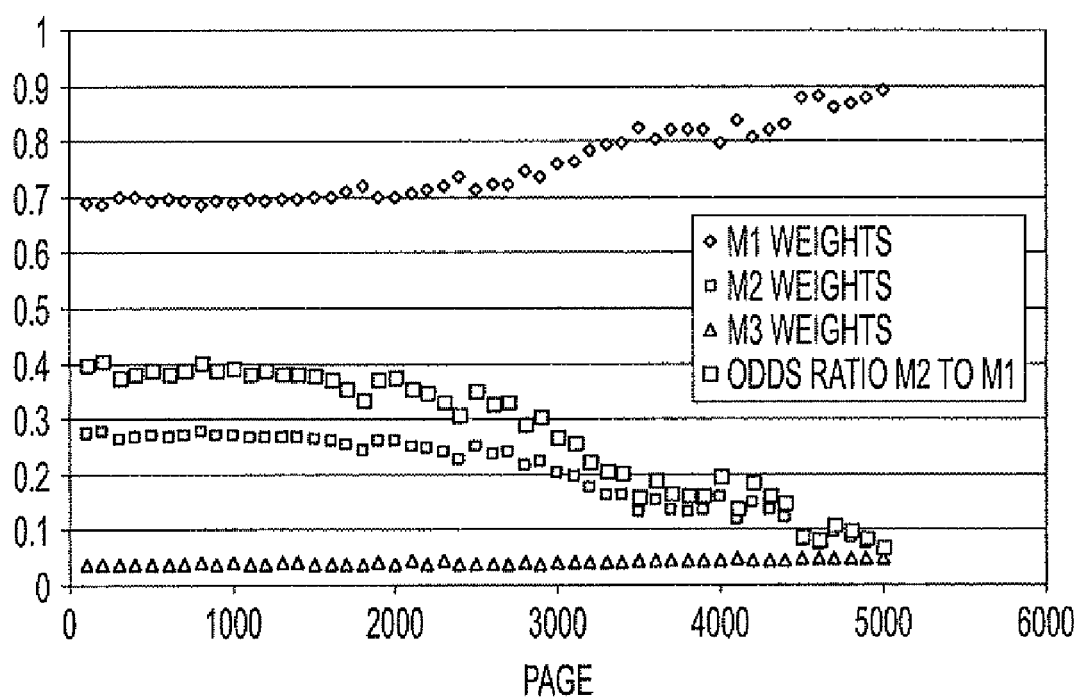
FIG. 16 illustrates exemplary calculated weights for three different models and odds ratios for these models, based on customer image data in FIG. 3.
Figure 17:
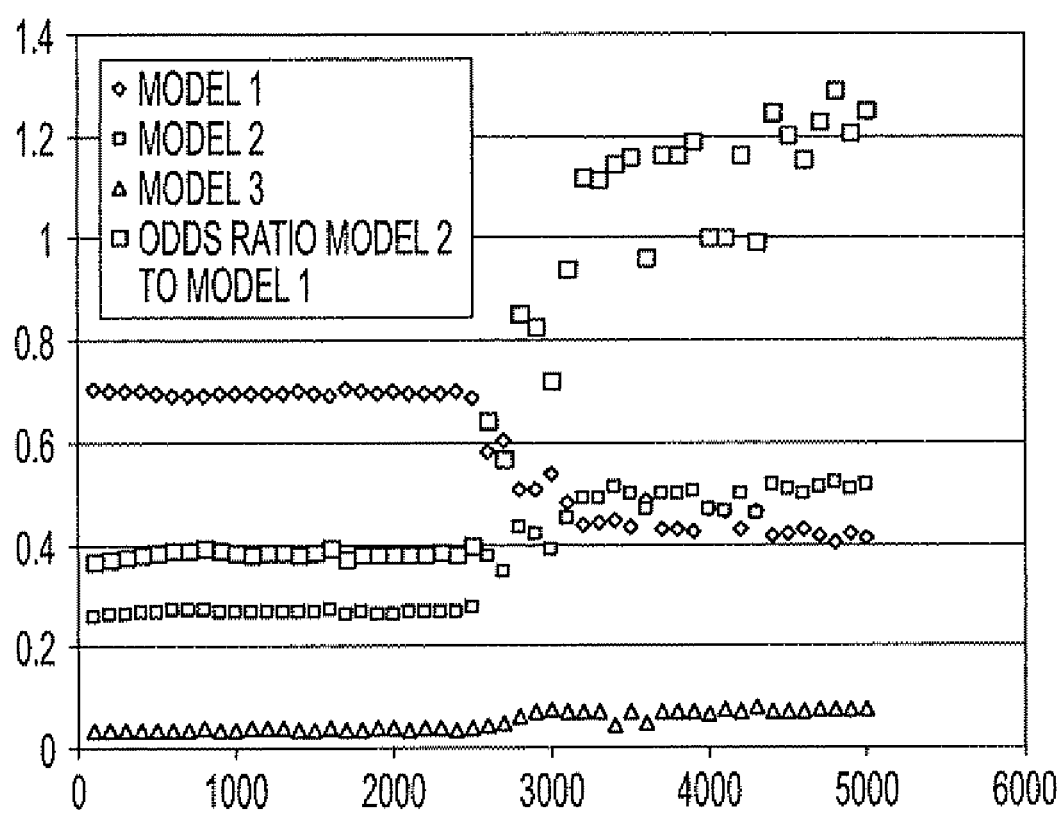
FIG. 17 illustrates exemplary calculated weights for three different models and odds ratios for these models, based on customer image data in FIG. 4.

FIGS. 16 and 17 show the results of the equation shown in FIG. 15 for the three models, M1, M2 and M3, on the collected IQ parameter values for the customer documents shown in FIGS. 3 and 4. As can be seen in FIG. 16, the most probable model for the data represented by FIG. 3 tends to be a drift model M1 as more IQ parameter values are collected. The odds ratio, indicating that the model is a drift model M1 rather than an abrupt step change model M2, also increase as more IQ parameter values are collected. Thus, the method predicts M1 as the best fit model.

FIG. 17 predicts a linear drift model, M1, until formed image 2500. From this point on, the model tends to an abrupt step change model M2. Thus, despite the noise shown in FIG. 4, the abrupt step change in collected IQ parameter values for banding of the customer documents is easily detected and the system predicts M2 as the best fit model for this case.

Figure 18:
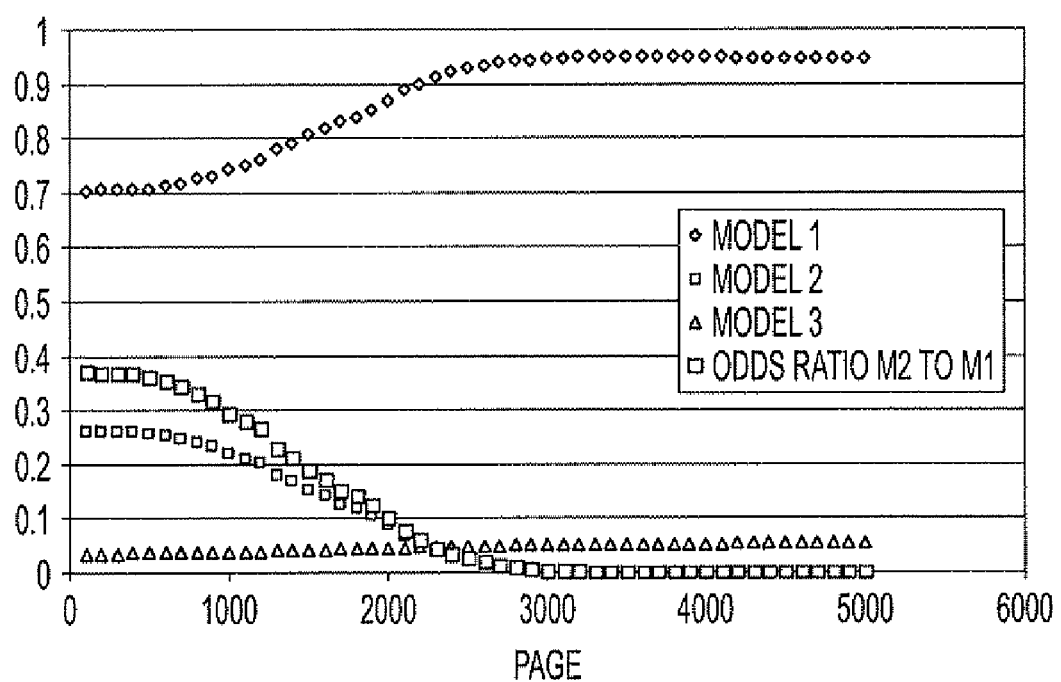
FIG. 18 illustrates exemplary calculated weights for three different models and odds ratio for these models, based on test pattern data in FIG. 5.
Figure 19:
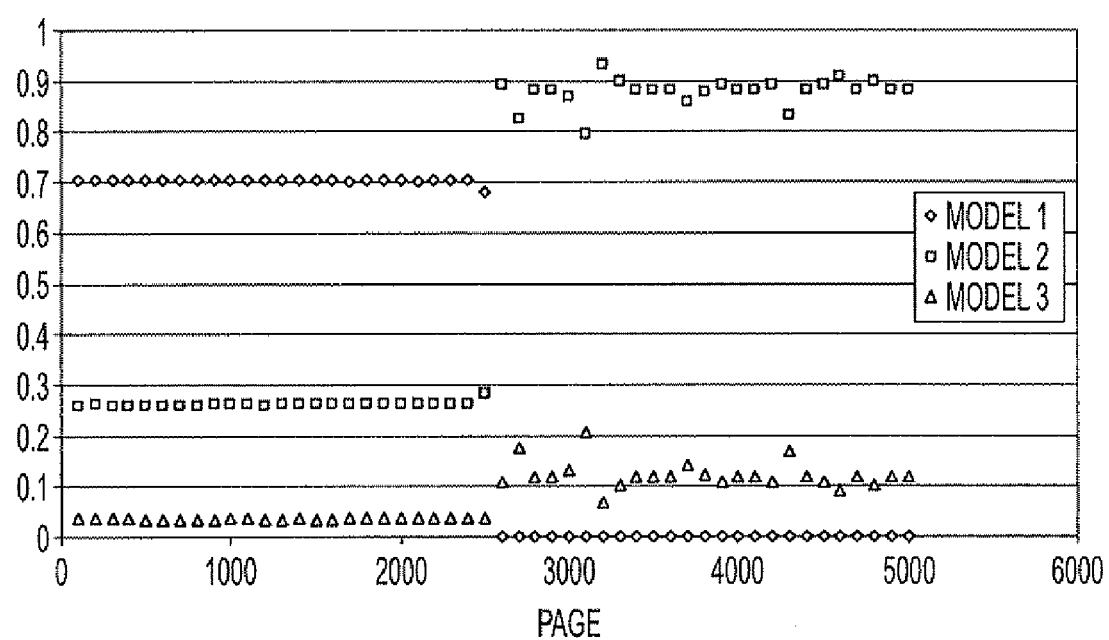
FIG. 19 illustrates exemplary calculated weights for three different models based on test pattern data in FIG. 6.

FIGS. 18 and 19 show a similar analysis to that for FIGS. 16 and 17 for the collected IQ parameter values for the test patterns, as shown in FIGS. 5 and 6. Their results are essentially the same as those for the customer documents, but because the noise and randomness in the test pattern is lower than that for the customer documents, the signals shown in FIGS. 18 and 19 are clearer and more definite.

Thus, the odds ratios may be used to determine the most probable best fit model form among the models fitted.

As illustrated in FIGS. 10-13, because the models are fitted by using maximum likelihood techniques or the least square errors techniques, the best fit parameters values for the models will filter noise from the collected IQ parameter values by "averaging" out noise. Therefore, if, for example, the best fit is linear M1 model fitted to a sequence of collected IQ parameter values the slope and intercept of the M1 model indicates the most likely noise free value for the past and present value of the collected IQ parameter values for the image forming device. A slope of zero would indicate that the collected IQ parameter values are not changing much with the time and the intercept would correspond to a noise free collected IQ parameter value. A positive slope would indicate deterioration with time of the collected IQ parameter values.

In step S1110, the fit parameter values for the best fit model are used to determine a current modeled IQ parameter value, and a current trend in the IQ parameter value. These values provide a "noise free" estimate of the current IQ parameter values and afford a predictive capability. Operation of the method proceeds to step S1120.

In step S1120, the method determines if a predicted IQ parameter value is above a threshold that would indicate a significant deterioration in the image forming device, or at what point in time or number of uses that IQ parameter is predicted to exceed the threshold. In this manner, it may be possible to predict a date for a future maintenance call based on when the best fit model predicts that that IQ parameter value will fail to meet the threshold.

Step S1120 is a determination step. If in step S1120, it is determined that the current IQ parameter value is within specification, or that there is currently no requirement to schedule a future servicing of the image forming device based on the future predicted IQ value, then the method returns to step 1010 to receive the next input image.

If, in step S1120, it is determined that there is a need to report the status, or future possible status of the image forming device, then the method proceeds to S1130.

In step S1130, the current and/or future predicted IQ values may be output to a user, service engineer or manufacturer of image forming device, along with warnings indicating that the image forming device no longer meets a certain specification, or that image forming device may, in the near future, not the meet the certain specification. This step may also output the current best fit model type. Operation of the method may proceed to step S1140, or directly to step S1160 where operation of the method ceases.

In step S1140, the best fit model, and the parameters of the best fit model, may be fed into, for example, an expert system that compares the best fit model and the best fit parameters to data in a database to determine a probable cause of failure. The database may include, for example, known failure mechanisms for the image forming device and the corresponding expected best fit models and fit parameters.

The best fit model and the parameters may also be compared to historical data for the image forming device. For example, the times of replacements of consumables, maintenance visits and environmental data collected by the image forming device, or sensors placed around the image forming device, may be reviewed. By comparing the best fit model and the parameters to both the failure database and historical data, the most probable diagnosis of the issue with the image forming device may be determined. Operation of the method proceeds to step S1150.

In step S1150, a determined diagnosis maybe output to a user, service engineer or manufacturer so that the proper actions may be taken.

The method proceeds to step S1160 where operation of the method ceases.

Steps S1090-S1120 and S1140, namely, the model fitting, weighted calculation, odds ratio calculation and probable causes of failures determining are computationally intensive. Image forming devices 1 and 2 may perform any or all of the above analysis internally, and then may present the results on any display screen directly to a user. In the case of image forming device 1, because this device is connected to network 9 and Internet 5, the results of the analysis may be sent to any of the devices connected to network 9 a Internet 5. A network administrator or service agent within a particular company, or an external service agent on the Internet, or the manufacturer of the image forming device, for example, may be informed of the current state of the image forming device. The network administrator, service agent or manufacturer may then be in a position to take action to remedy the issue with the image forming device, either by communicating with the image forming device directly over a network to change parameters within the device, or by calling or sending a service agent to examine and repair the image forming device.

Steps S1090-S1120 and S1140 may, like earlier steps, be performed several other places within the elements of the system shown in FIG. 1. Optimal positioning may to take advantage of more powerful computer and analysis resources than those available within the image forming devices. In this case, either the results of scanning the images formed by image forming device 1, or the results of collected IQ parameter values for each page may be sent over a network to a separate device that performs the analysis. The results of the analysis may then be displayed on any of the devices connected, for example, to network 9 or to Internet 5, and maintenance performed accordingly. Further, the results of the analysis may be transmitted back to the image forming device so that these results may be displayed on a display on the image forming device.

Similar schemes for processing collected IQ parameter values may be performed for IQ measured on a scanning device. Results from images scanned on a scanning device may also be transmitted back to image forming device 1, shown in FIG. 1, as well as displayed on any terminal or computer connected to network 9 or Internet 5 and appropriate action may be taken by the network administrator, service agent or manufacturer.

Figure 21:
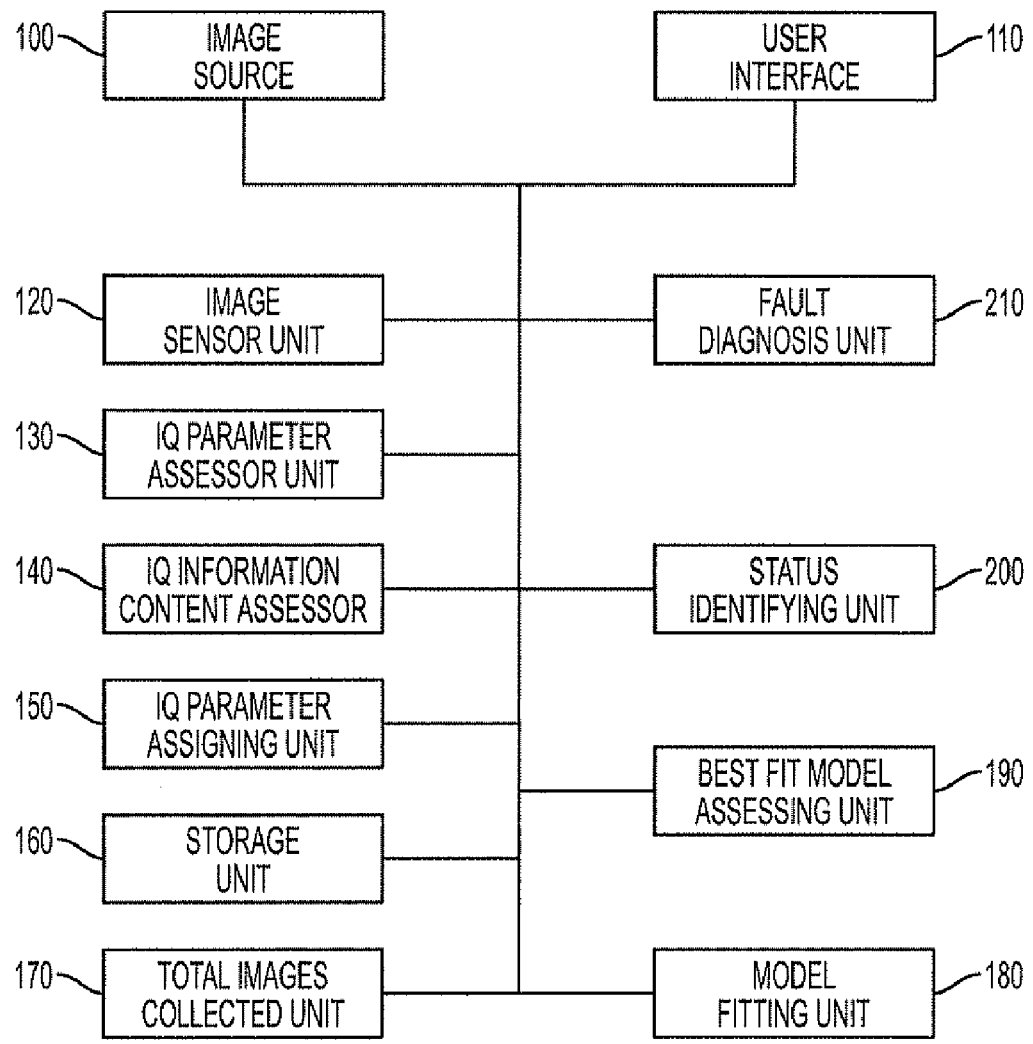
FIG. 21 illustrates an exemplary embodiment of a system for monitoring changes in IQ according to this disclosure.

An exemplary system for implementing the above method is illustrated in FIG. 21. The various components shown in FIG. 21 may be implemented, as discussed in detail later, at many points in the network environment shown in FIG. 1.

The images from the image source are scanned by an image sensor unit 120 to convert the formed image into digital data that can be processed by image processors in IQ parameter assessor unit 130. The IQ parameter assessor unit 130 measures the IQ parameter value and the quantity of information for the IQ parameter value within an image. IQ information content assessor unit 140 uses the information from IQ parameter assessor unit 130 to determine if images have enough information to provide a reasonable IQ parameter value. Images that contain sufficient information are assigned an IQ parameter value and identifier by IQ parameter assigning unit 150. The IQ parameter value and identifier are stored in storage unit 160. Storage unit 160 stores collected sets of IQ parameter values and identifiers for previously measured formed images.

Total images collected unit 170 uses the collected IQ parameter values stored in storage unit 160 to determine if enough IQ parameter values have been collected. The number of IQ parameter values collected should be great enough that, when models are fitted to the collected IQ parameter values as the noise in the fitted model parameters is sufficiently small to provide a reasonable indication of the status of the image forming device. When total images collected unit 170 determines that sufficient IQ parameter values have been collected, model fitting unit 180 fits the parameters of models stored on storage unit 160 to the collected IQ parameter values. Best fit model assessing unit 190 then assesses which is the best fit of the models available to the collected IQ parameter values. The best fit model assessing unit 190 outputs the single best fit model, and the best fit model, parameters associated with that model, to status identifying unit 200. Status identifying unit 200 takes the best fit model predicted, and the parameter values of the best fit model and finds a current modeled IQ parameter value. Status identifying unit 200 compares these values to a threshold stored on storage unit 160. If the current modeled. IQ parameter value fails to meet the threshold then status identifying unit 200 outputs, to, for example, user interface 110, a current modeled IQ parameter value along with a warning indicating that this value fails to meet the threshold. Status identifying unit 200 may also output to, for example, user interface 110, a future time that the modeled IQ parameter value will fail to meet the threshold so that scheduling of maintenance in the future may be performed.

Best fit model assessing unit 190 may also output values to a fault diagnosis unit 210. Fault diagnosis unit 210 may compare the current best fit model and the parameters of the best fit with a database on storage unit 160 to determine a probable cause of any IQ parameter value failing to meet a threshold. The probable cause may be based on the best fit model and the parameters of the best fit model. The fault diagnosis unit 210 may use data stored on storage unit 160 regarding the history of the image forming device, for example, maintenance records, replacement of consumables and environmental data collected around the image forming device. Based on this information, fault diagnosis unit 210 may output, for example, to user interface 110, a most likely probable cause of the IQ parameter value failing to meet the threshold.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for monitoring an output from an image forming device, comprising:
    inputting a plurality of images formed by an image forming device;
    measuring an image quality parameter for each of the plurality of input images;
    assigning an image quality parameter value and an identifier for the measured image quality parameters;
    storing the assigned image quality parameter values and identifiers as a collection;
    fitting a plurality of models, including at least a linear model, a step model and a combination linear-step model, to the collection by determining values of fit parameters for each of the models that relate to the collection;
    determining a single best fit model from among the plurality of models based on a best fit to the collection, wherein an Akaike Information Criterion score is calculated for each of the plurality of models fitted to the collection;
    determining a current modeled image quality parameter for the image forming device based on the best fit model; and
    outputting the current modeled image quality parameter.

2. The method according to claim 1, wherein the identifier is a sequence number corresponding to one of the plurality of images.

3. The method according to claim 1, wherein the identifier is a time of formation of one of the plurality of images.

4. The method according to claim 1, further comprising:
    determining a quantity of information for the image quality parameter for each of the plurality of images; and
    discarding images from the plurality of images for which the determined quantity of information is below a predetermined threshold.

5. The method according to claim 1, wherein the plurality of models is fitted to the collection by using a maximum likelihood technique or a least squares fit technique.

6. The method according to claim 1, further comprising:
    comparing the current modeled image quality parameter to a predetermined image quality parameter; and
    outputting a warning message when the current modeled image quality parameter is greater than the predetermined image quality parameter.

7. The method according to claim 1, further comprising:
    using the single best fit model to predict a time when a trend in the current modeled image quality parameter will fall below a predetermined image quality parameter; and
    outputting a message indicating the predicted time.

8. The method according to claim 6, further comprising:
    outputting, based on the best fit model and the determined fit parameters of the best fit model, a probable cause of any image quality degradation, when the current modeled image quality parameter is greater than the predetermined image quality parameter.

9. The method according to claim 1, wherein each of the plurality of images is an image formed by a customer of the image forming device during a normal course of business.

10. The method according to claim 1, wherein each of the plurality of images is a predetermined test pattern.

11. A system for monitoring an output from an image forming device, comprising:
    an input unit that scans a plurality of images formed by an image forming device;
    an image quality measuring unit that measures an image quality parameter for each of the plurality of input images;
    an assigning unit that assigns an image quality parameter value and an identifier for the measured image quality parameters;
    a storing unit that stores the assigned image quality parameter values and identifiers as a collection;
    a fitting unit that fits a plurality of models, including at least a linear model, a step model and a combination linear-step model, to the collection by determining values of fit parameters for each of the models that relate to the collection;
    a best fit determining unit that determines a single best fit model from among the plurality of models based on the best fit to the collection, wherein an Akaike Information Criterion score is calculated for each of the plurality of models fitted to the collection;
    a current image quality determining unit that determines a current modeled image quality parameter for the image forming device based on the best fit model; and
    an output unit that outputs the current modeled image quality parameter.

12. The system according to claim 11, wherein the identifier is a sequence number corresponding to one of the plurality of images.

13. The system according to claim 11, wherein the identifier is a time of formation of one of the plurality of images.

14. The system according to claim 11, further comprising a quantity of information determining unit that determines a quantity of information for the image quality parameter for each of the plurality of images, and discards images from the plurality of images that contain a quantity of information for the image quality is below a predetermined threshold.

15. The system according to claim 11, wherein the best fit determining unit uses a maximum likelihood technique or a least squares fit technique to fit each of the plurality of models to the collection.

16. The system according to claim 11, further comprising:
    a predetermined image quality comparing unit that a compares the current modeled image quality parameter to a predetermined image quality parameter, wherein the output unit outputs a warning message when the current modeled image quality parameter is greater than the predetermined image quality parameter.

17. The system according to claim 11, further comprising:
    a time calculating unit that uses the single best fit model to predict a time when a trend in the current modeled image quality parameter becomes greater than a predetermined image quality parameter, wherein the output unit outputs a message indicating the predicted time.

18. The system according to claim 16, further comprising:
    a probable cause determination unit that based on the best fit model and the determined fit parameters of the best fit model, determines a probable cause of any image quality degradation, when the current modeled image quality parameter is greater than the predetermined image quality parameter, wherein the output unit outputs the probable cause.

19. The method according to claim 1, wherein the probability that any of the plurality of models is the single best fit model is calculated by $$\Delta_i = AIC_i - \min(AIC_1, AIC_2, AIC_3 \ldots ), \quad i = 1, 2, 3 \ldots$$

$$wj = \frac{e^{-\Delta_i/2}}{\sum_j e^{-\Delta_j/2}}, \quad i = 1, 2, 3$$

$$O_{i,j} = \frac{w_i}{w_j}$$

wherein $O_{i,j}$ indicates how much more likely model i is to be the single best fit model than model j.

20. The system according to claim 11, wherein the best fit determining unit calculates the probability that any of the plurality of models is a single best fit model by $$\Delta_i = AIC_i - \min(AIC_1, AIC_2, AIC_3 \ldots ), \quad i = 1, 2, 3 \ldots$$

$$wj = \frac{e^{-\Delta_i/2}}{\sum_j e^{-\Delta_j/2}}, \quad i = 1, 2, 3$$

$$O_{i,j} = \frac{w_i}{w_j}$$

wherein $O_{i,j}$ indicates how much more likely model i is to be the single best fit model than model j.

* * * * *